Nov. 19, 1968  J. ADAMSKI  3,411,821
CONVERTIBLE TOP MECHANISM
Filed July 7, 1967  13 Sheets-Sheet 1
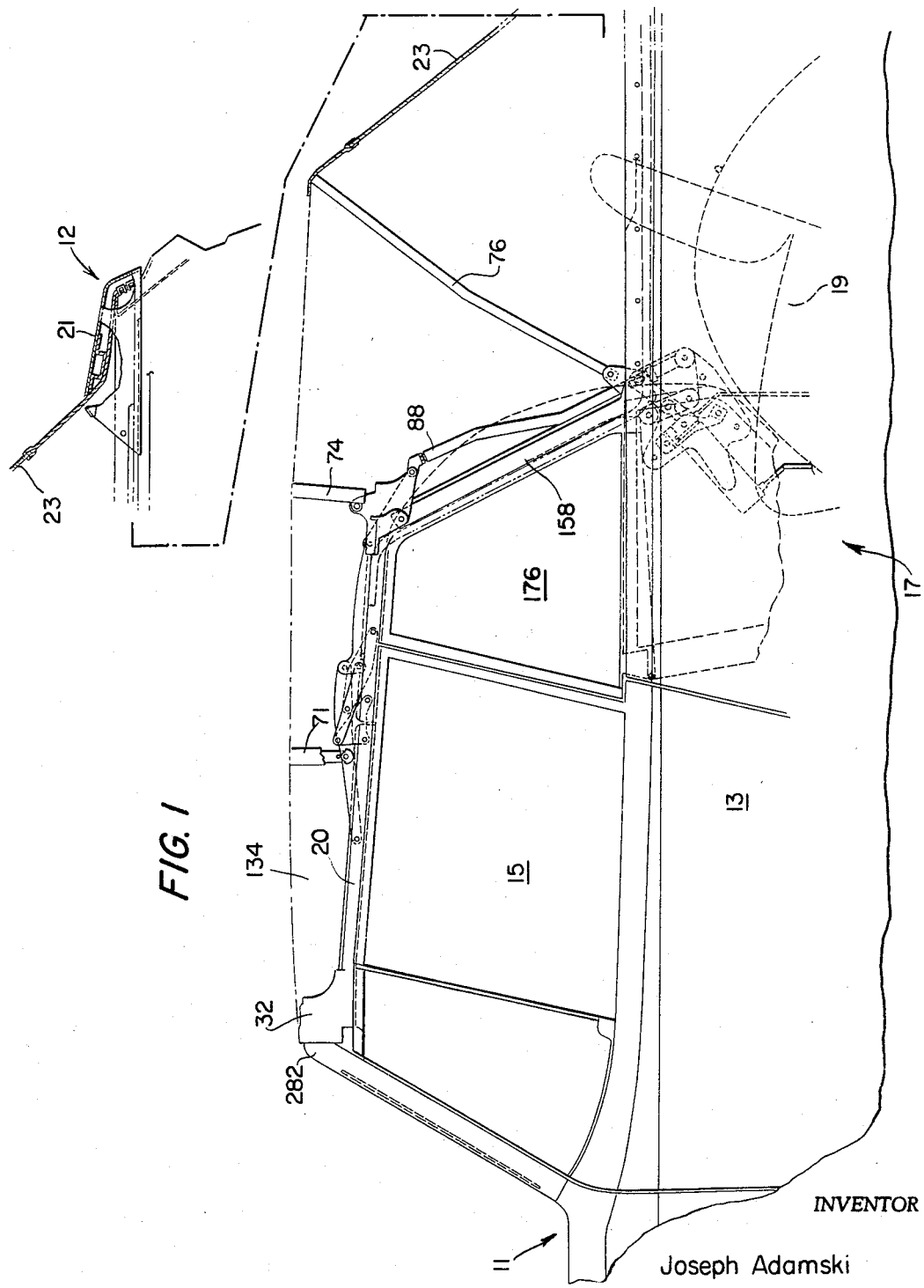
FIG. I
INVENTOR
Joseph Adamski
BY Stowell & Stowell
ATTORNEYS

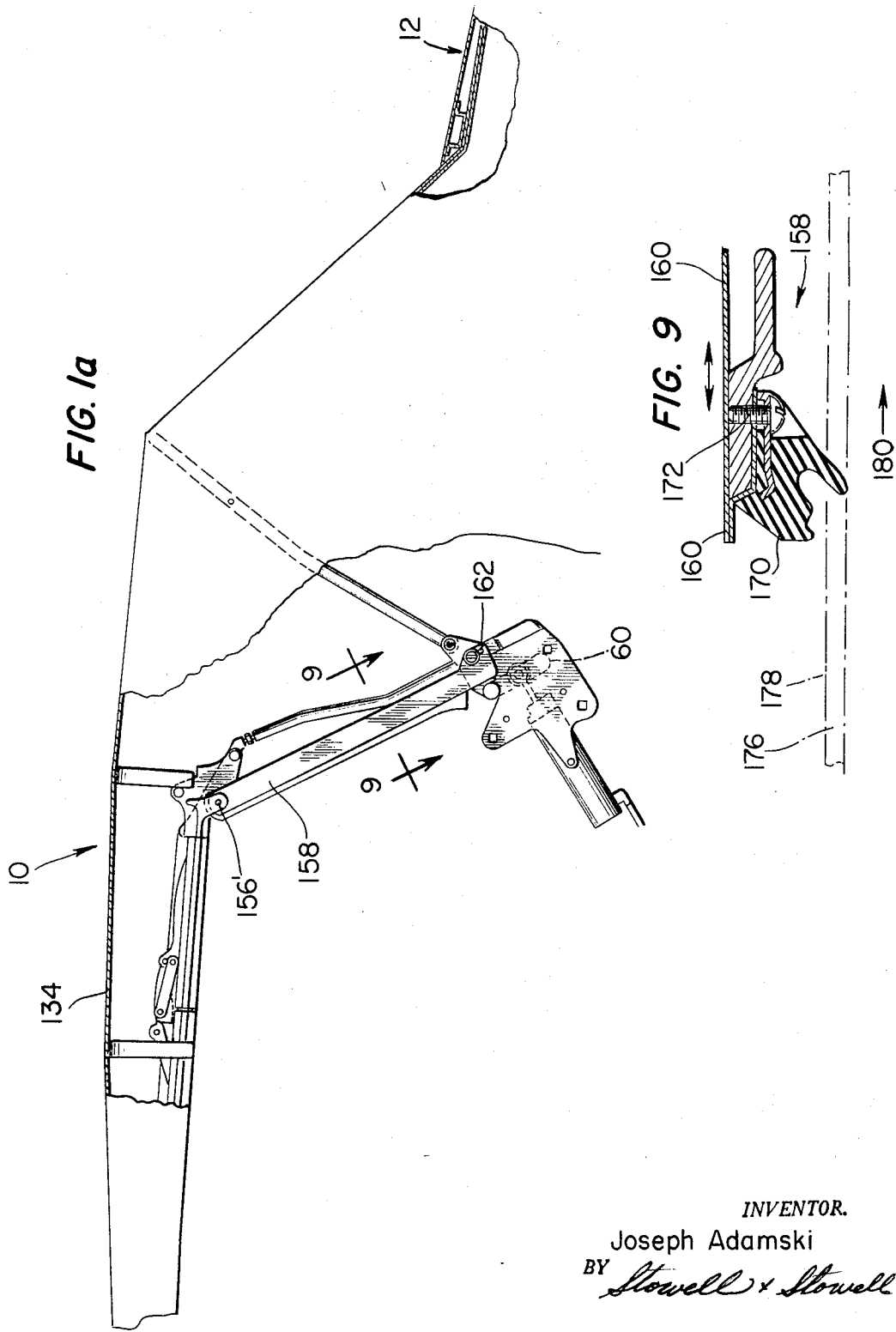

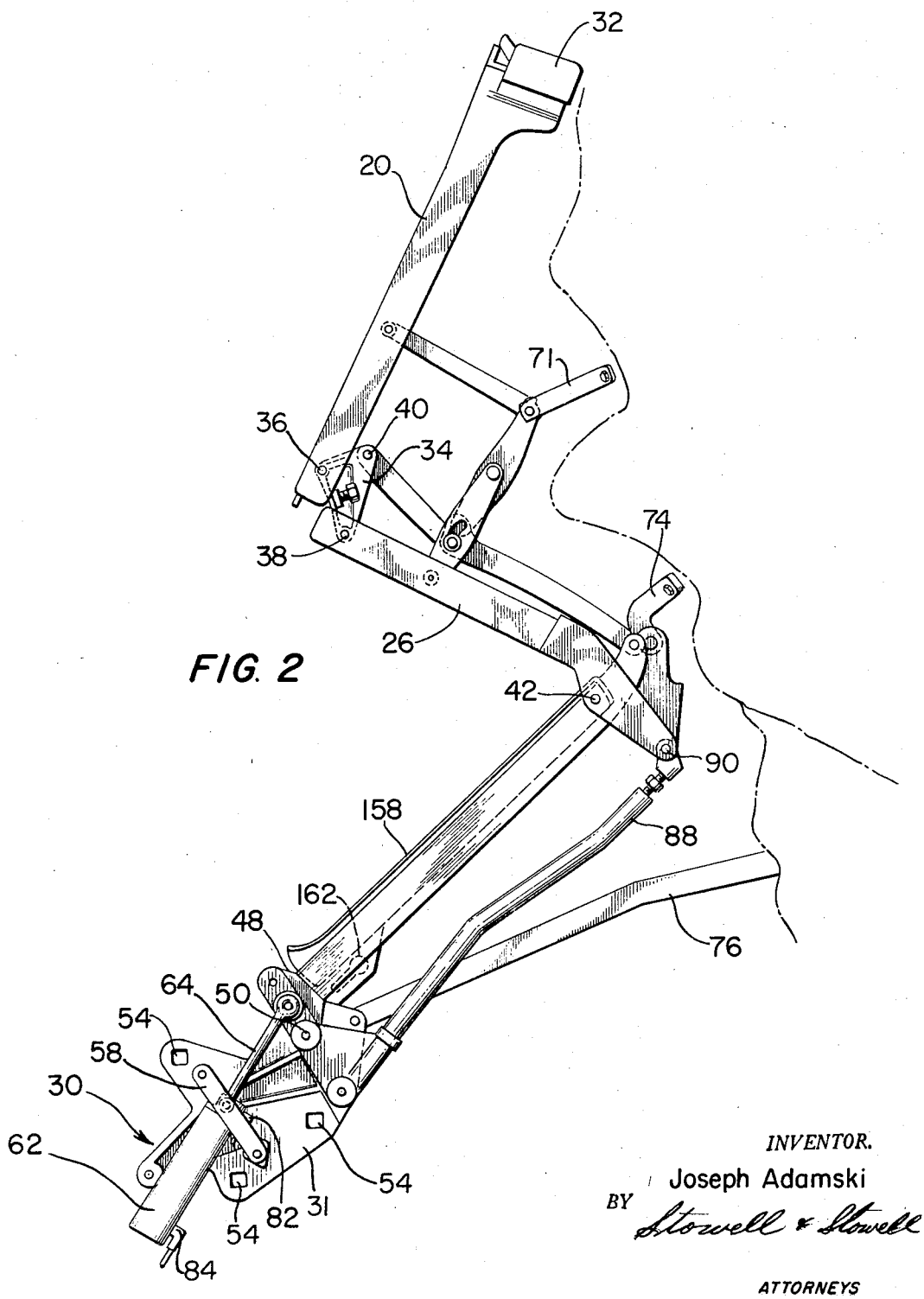

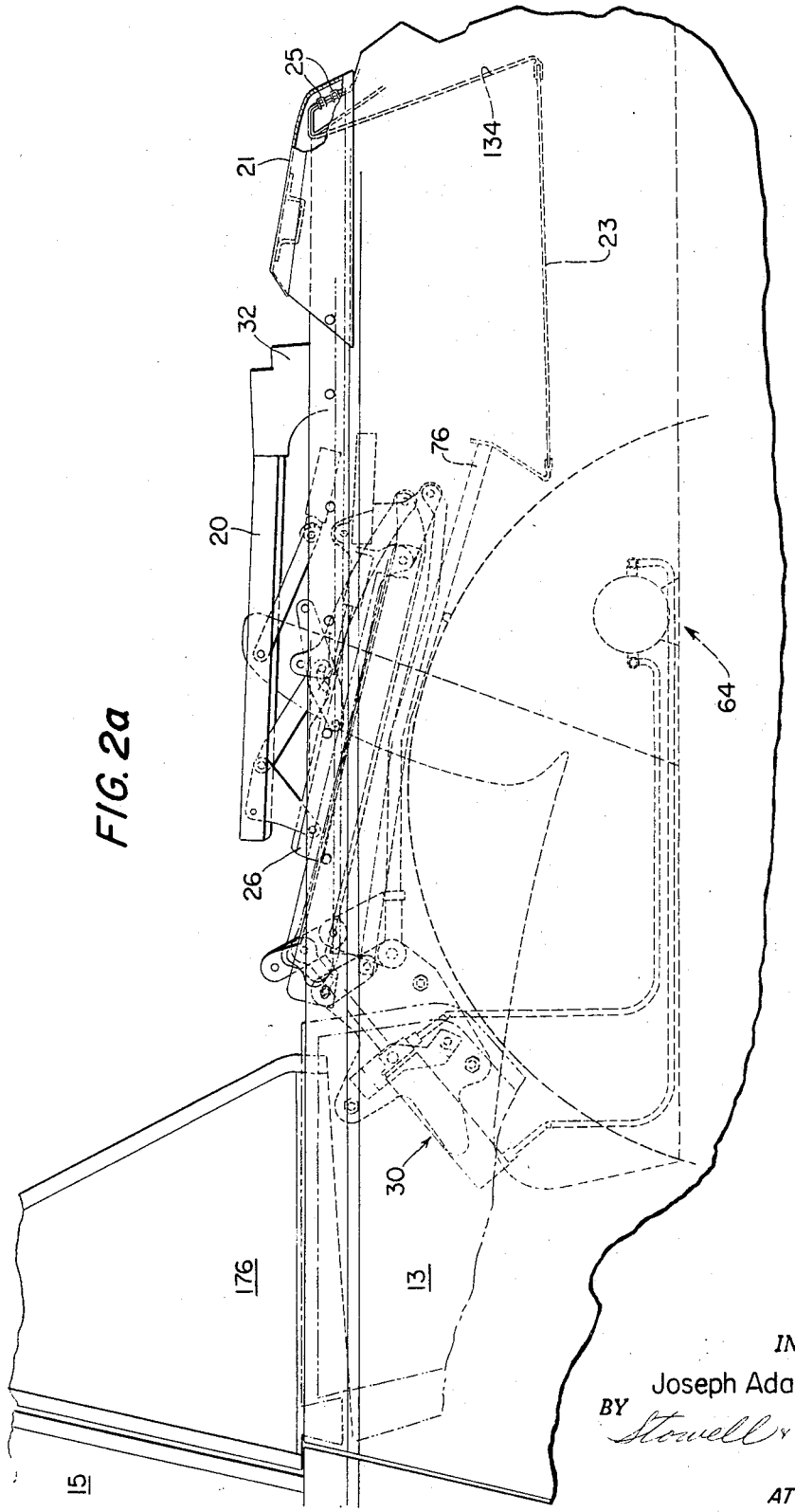

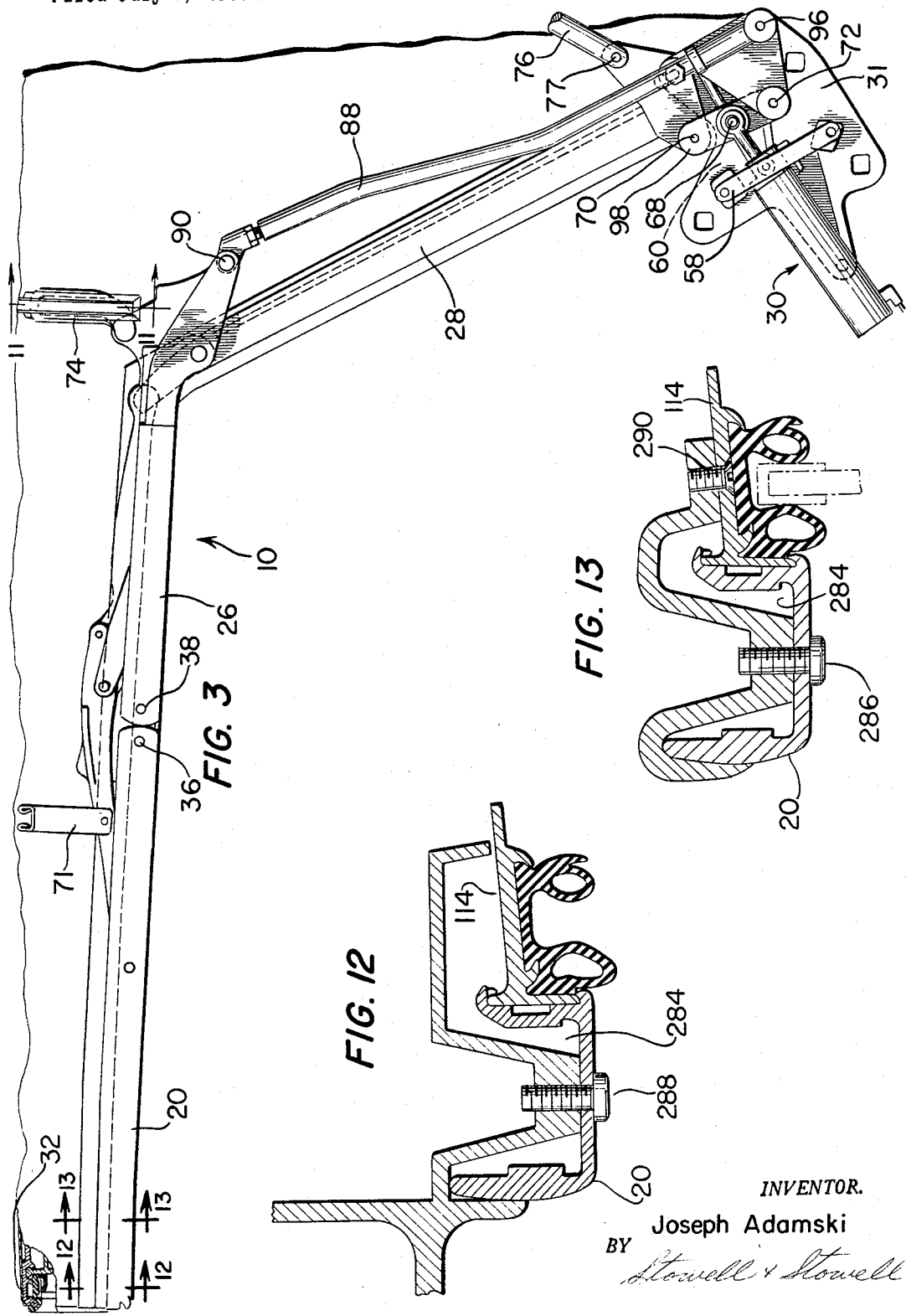

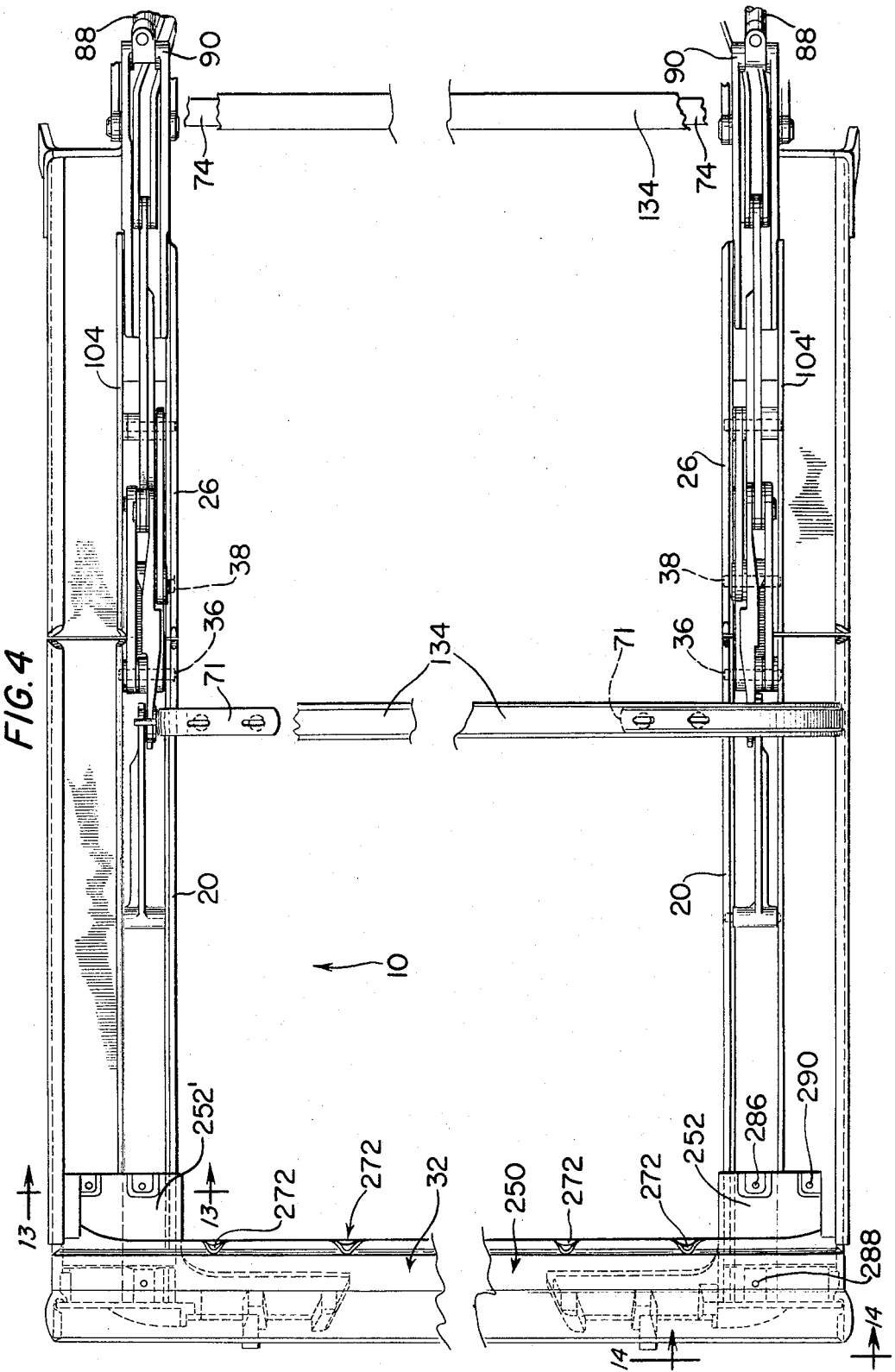

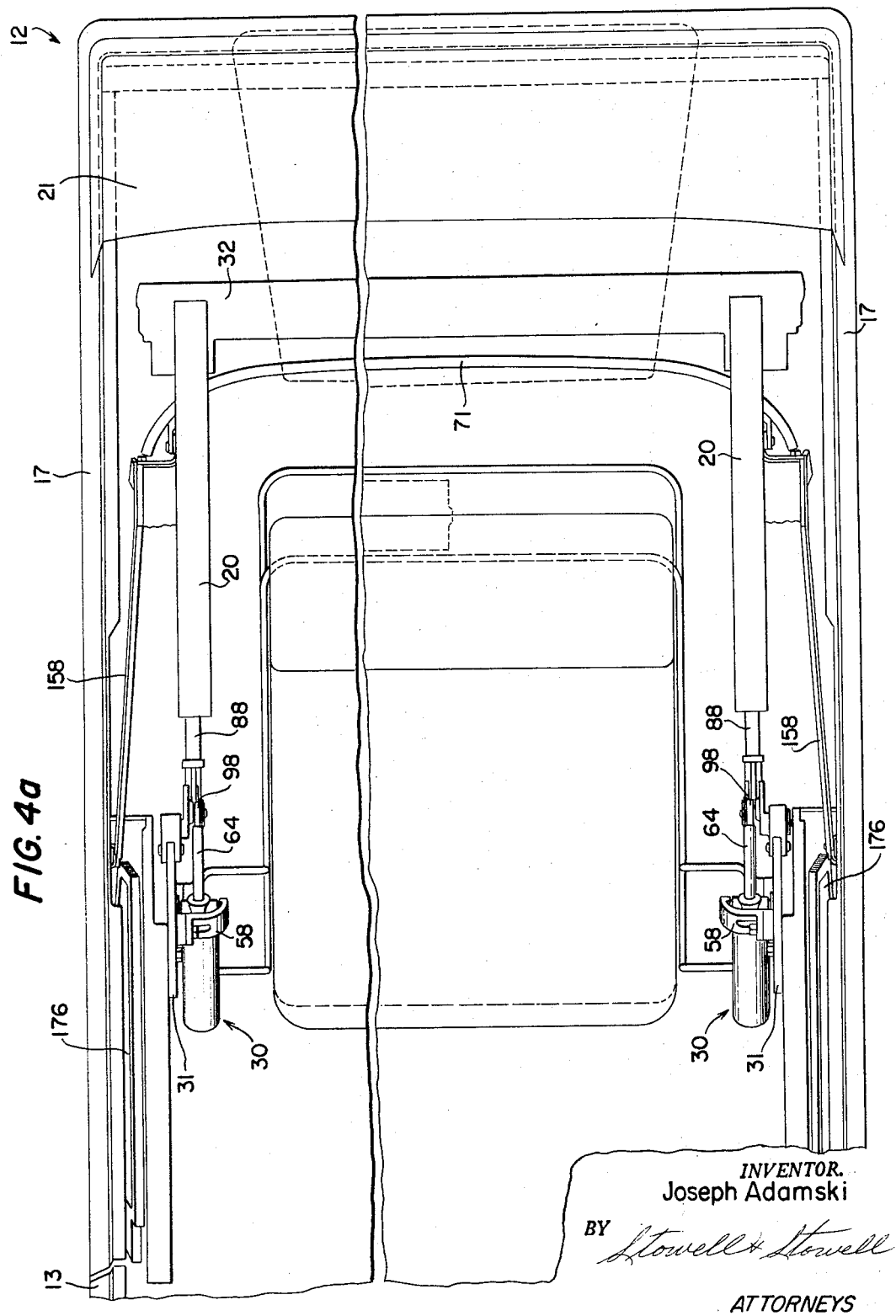

Nov. 19, 1968 J. ADAMSKI 3,411,821
CONVERTIBLE TOP MECHANISM
Filed July 7, 1967 13 Sheets-Sheet 8
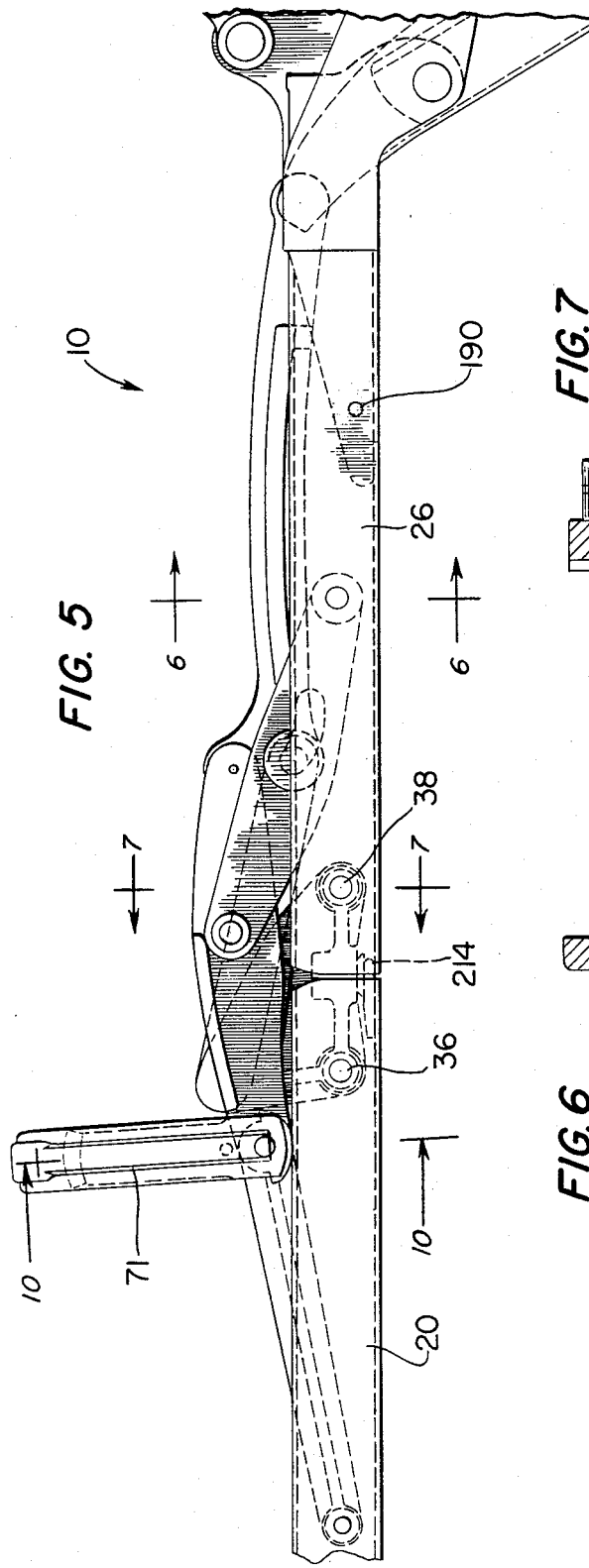
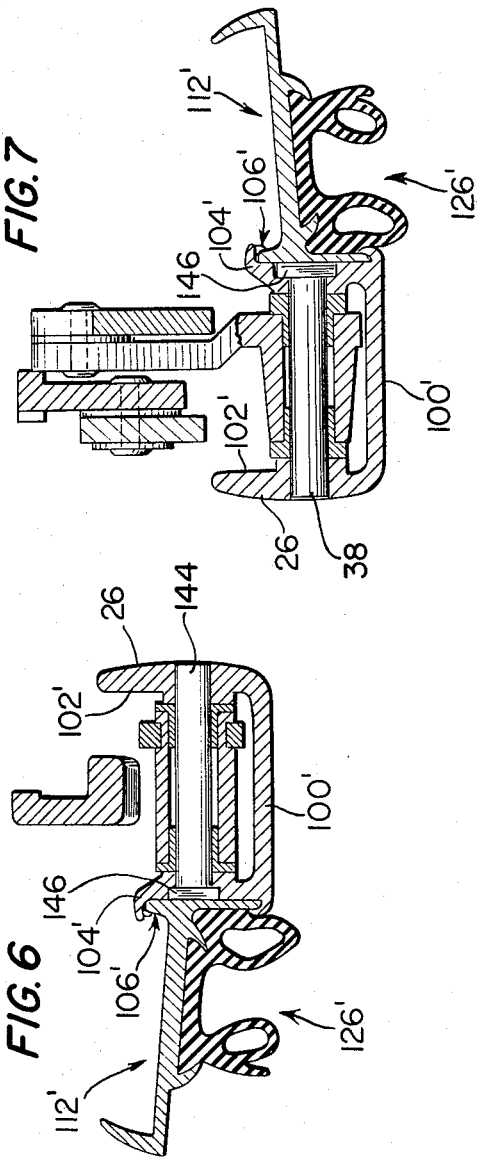
INVENTOR.
Joseph Adamski
BY
*Stowell & Stowell*
ATTORNEYS INVENTOR.
Joseph Adamski
BY
Stowell & Stowell
ATTORNEYS

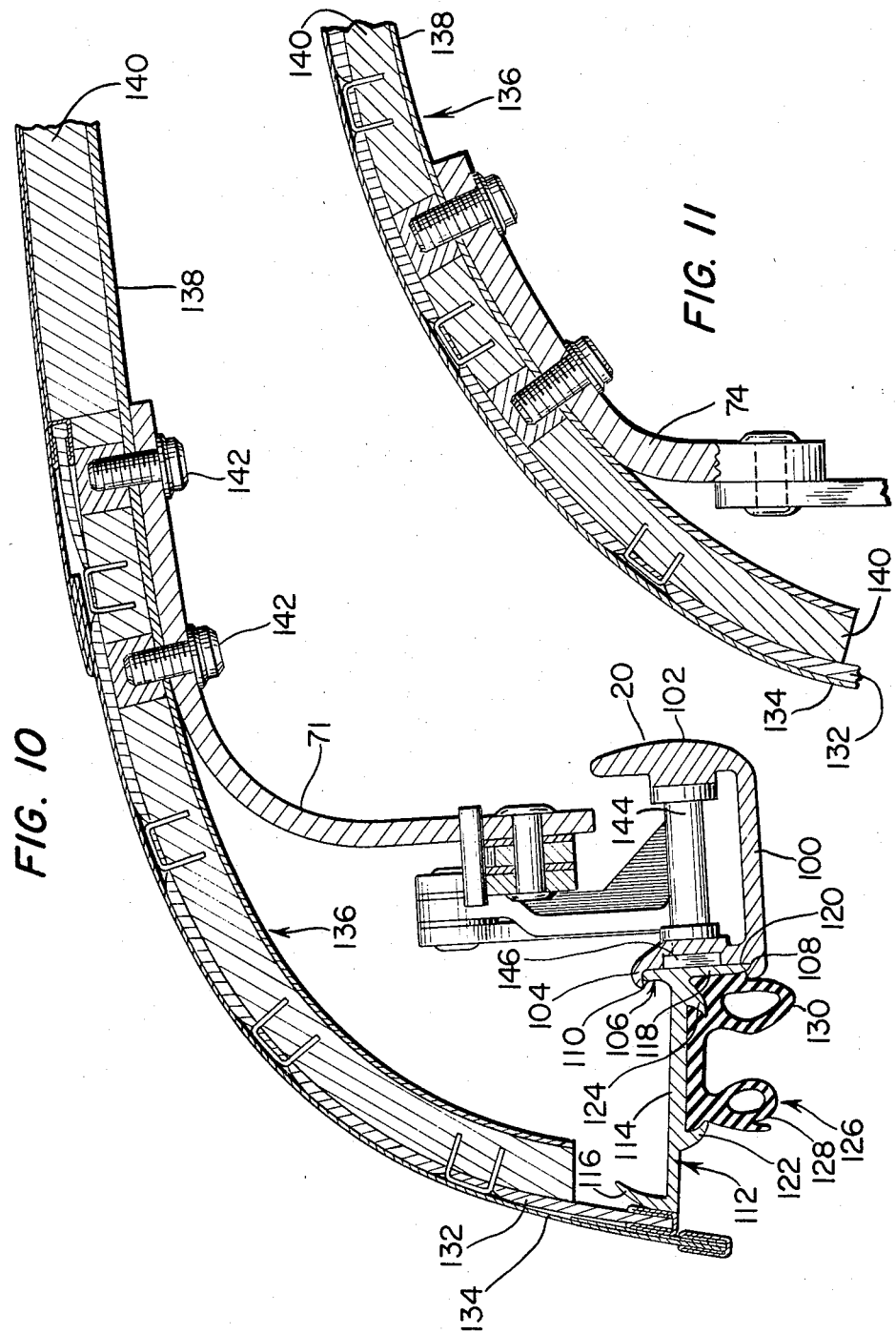

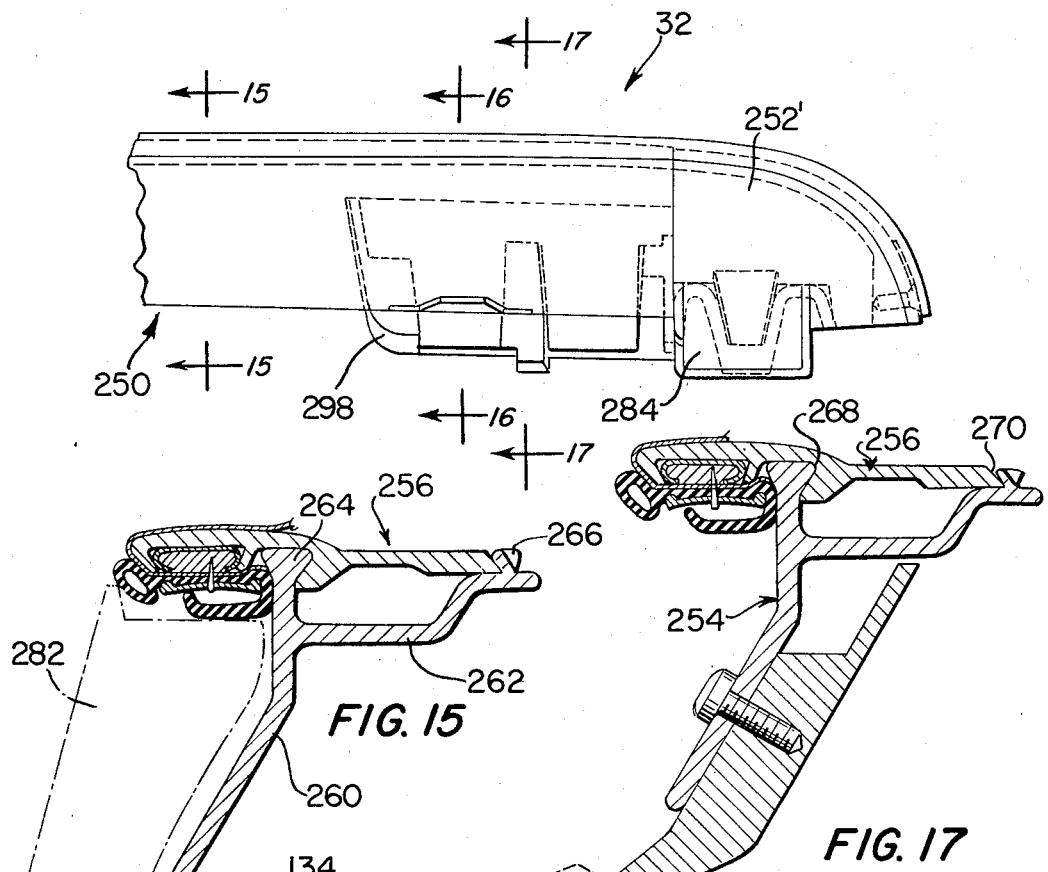

Nov. 19, 1968   J. ADAMSKI   3,411,821
CONVERTIBLE TOP MECHANISM
Filed July 7, 1967   13 Sheets-Sheet 12
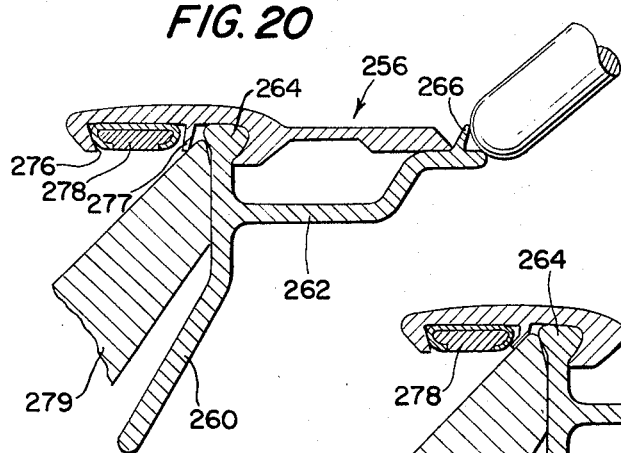
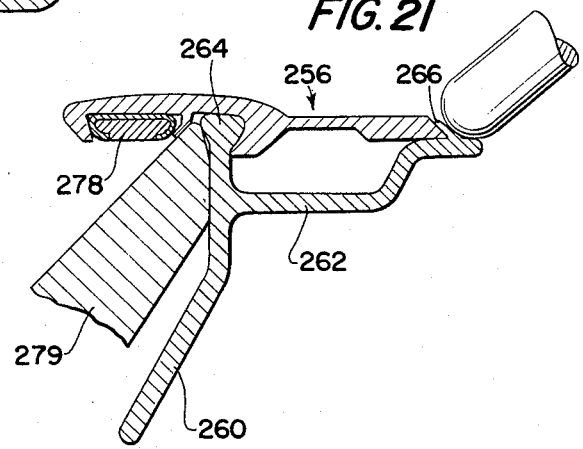
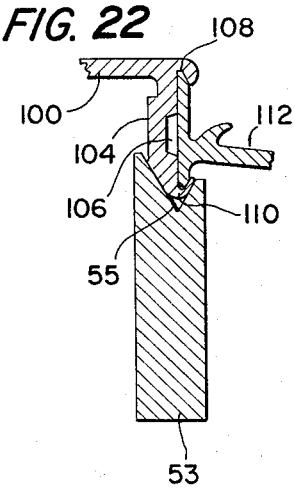
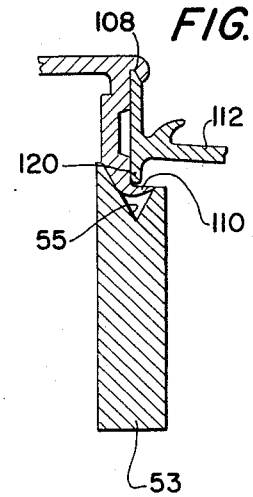
INVENTOR.
Joseph Adamski
BY
Stowell & Stowell
ATTORNEYS

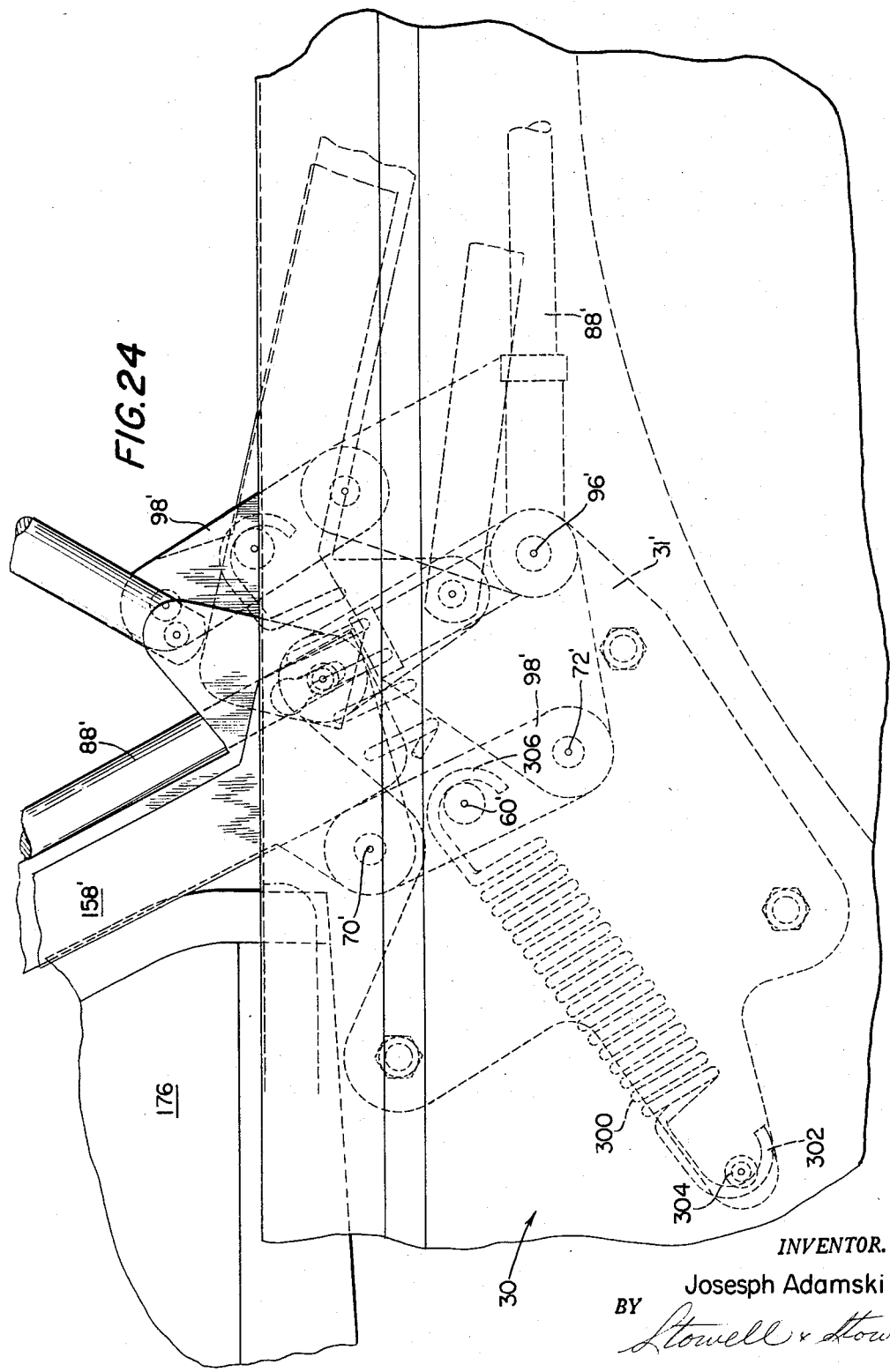

United States Patent Office 3,411,821
Patented Nov. 19, 1968

3,411,821
CONVERTIBLE TOP MECHANISM
Joseph Adamski, Brooklyn, Mich., assignor to Dura Corporation, Oak Park, Mich., a corporation of New York
Filed July 7, 1967, Ser. No. 651,811
4 Claims. (Cl. 296—117)

ABSTRACT OF THE DISCLOSURE

Adjustable means are provided at the pivotal intersection between the front and center rails of the linkage means of a convertible top mechanism to reduce to a minimum play, when the top is extended, between these members and a plate member to which the front and center rails are pivotally attached. The adjustable means provides a force which urges the plate member in a generally normal direction away from the front and center rails.

---

It is an object of the present invention to provide an improved folding top mechanism for vehicles and in particular a convertible top mechanism wherein each of the elements thereof is formed from aluminum.

A further object is to provide an improved folding top mechanism for vehicles wherein the various elements forming the folding top mechanism are rigidly or articulately secured together primarily by the use of pins.

A further object is to provide for a Jeep type sports vehicle, a folding top of convertible passenger car quality wherein the vehicle may have slidable and/or retractable glass in the side doors and quarter windows.

A further object is to provide a folding top that will have a rigid header and bows mounted on foldable side rail assemblies onto which are installed complete provisions for latching the folding top onto the body windshield header and also are installed provisions for completed sealing against rain and wind.

A further object is to provide a method for weather sealing the back edge of the side quarter windows and also for attaching the top deck fabric in this area, where in the design and configuration of the quarter window is such that it must swing rearward excessively beyond the side view line of the rear pillar of the folding top side rail mechanism.

A further object is to provide a folding top for a vehicle having a quarter window which swings rearward and downward into the body side so that it is flush with the belt line of the body side.

Another object is to provide a folding top on a vehicle body in such a manner so that the top deck fabric along with the fabric of the hard glass assembly is fastened to the sheet metal of the body side and rear panels by stapling or drive screws in such a manner as to eliminate the use of tacking strip requirements for fastening such fabric thereto and also to eliminate the requirements for drain trough provisions on the inside of the body.

A further object is to provide a rear cover panel at the rear of vehicle body to be installed over the top deck fabric for the purpose of esthetics and also for the purpose of facilitating the installation and operational stowing of a substantially large hard glass window.

A further object is to provide a folding top framework fabricated primarily from aluminum in such a manner as to utilize extrustions and die castings as the mode of fabrication and thereby eliminate welding procedures.

Another object is to provide a folding top which is receptive to manual operation and also operation by an energized power system, the manual operation to be accomplished with very little effort.

Another object is to provide a tightly trimmed folding top for a Jeep type sports vehicle which is operable manually or powered in which, aside from the activation of the folding top from either retracting to full storage or extending to full cover of the passenger compartment, supplementary manipulation of fabric seals or window glass is not necessary.

A further object of the present invention is to provide an improved folding top mechanism including novel tensing means to insure that the members forming the top assembly are in a rigid, rattle-free relationship when the top is fully extended.

A further object of the present invention is to provide an improved method of attaching the trim strips to the primary articulate elements of the folding top mechanism.

It is another object to provide a folding top structure including novel means for providing an adjustable seal between the roof structure and a rear quarter window of a vehicle.

These and further objects will become apparent to those skilled in the art from the following detailed description of the invention when considered in the light of the drawings wherein:

FIG. 1 is a fragmentary partial sectional view of a folding top structure constructed in accordance with the teachings of the present invention shown applied to a motor vehicle, portions of which are shown in frill lines and other portions of which are shown in phantom lines;

FIG. 1a is a fragmentary partial sectional view on an enlarged scale of a folding top structure shown in FIG. 1;

FIG. 2 is a view of the folding top structure illustrated in FIG. 1 with the folding top in a partially retracted or folded position;

FIG. 2a is a view of the folding top structure in the fully folded position;

FIG. 3 is an enlarged fragmentary partial sectional view of the roof structure illustrated in FIG. 1;

FIG. 4 is a top plan view of the convertible top illustrated in FIGS. 1, 2 and 3;

FIG. 4a is a top plan view of the convertible top in the position illustrated in FIG. 2a;

FIG. 5 is an enlarged detailed view of the means interconnecting the front and center rail sections of the convertible top illustrated in FIG. 1;

FIG. 6 is a section along line 6—6 of FIG. 5;

FIG. 7 is a section along line 7—7 of FIG. 5;

FIG. 9 is a section on line 9—9 of FIG. 1;

FIG. 10 is a section on line 10—10 of FIG. 5;

FIG. 11 in a section on line 11—11 of FIG. 3;

FIG. 12 is a section on line 12—12 of FIG. 3;

FIG. 13 is a section on line 13—13 of FIG. 3;

FIG. 14 is an enlarged fragmentary view of one end of the front bow of the convertible top on line 14—14 of FIG. 4;

3

Figure 18:
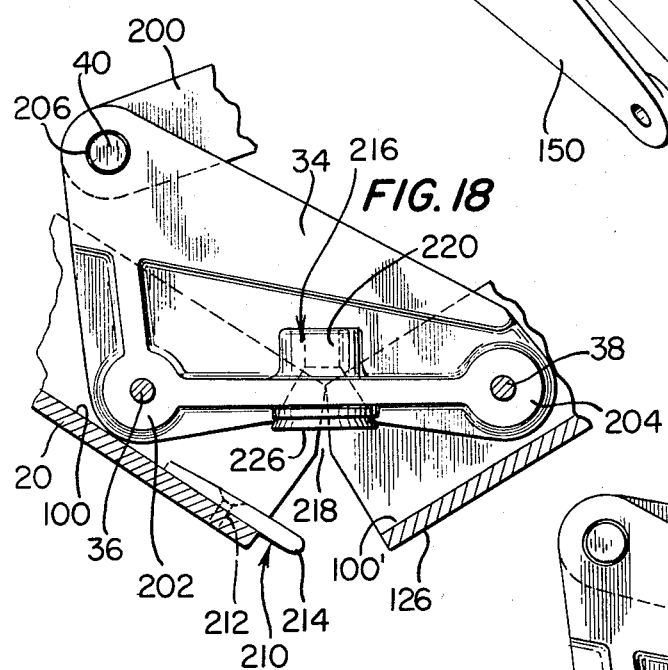
Figure 19:
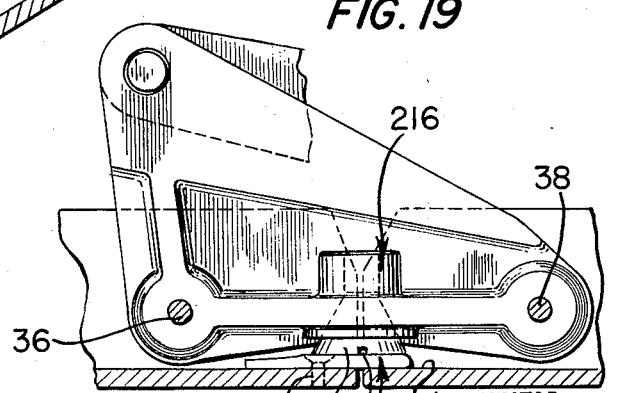

FIG. 15 is a section on line 15—15 of FIG. 14;
FIG. 16 is a section on line 16—16 of FIG. 14;
FIG. 17 is a section on line 17—17 of FIG. 14;
FIG. 18 is an enlarged fragmentary view of the connecting and tensioning elements between the front end and center rail;
FIG. 19 is a view similar to that illustrated in FIG. 18 with the center and forward rail portions in rectilinear alignment;
FIGS. 20 and 21 diagramatically illustrate procedures for staking the top header forming members;
FIGS. 22 and 23 diagramatically illustrate procedures for staking the side trim members; and
FIG. 24 is an enlarged fragmentary side view of modified actuator means for a convertible top of the invention.

Referring to the drawings and in particular to FIGS. 1 through 5, 10 generally designates the folding top structure of the invention. The folding top structure 10 is adapted to be received on a vehicle body 11 and when opened to extend from the vehicle's windshield header 282 at the front and to the rear of the vehicle deck, as shown at 12 in FIGS. 1 and 1a of the drawings.

In the subsequent discussion of the folding top 10 and the operative mechanisms thereof, reference made to the "forward," "center" or "rearward" disposition of any member, or the use of like terms, in the claims to be understood as with regard to the position thereof with respect to the front, center or back end of the vehicle on which the top is mounted.

The top structure 10 includes articulated side frame rails and interconnected cross bows which form a framework over which a fabric cover 134 extends. The side frame rails are each made up of a front side frame rail section 20, a center side frame rail section 26, and a rear side frame rail section 28. The articulated side frame rails are symmetrically opposite and are either manual or power operated by actuating means generally designated 30.

As will be appreciated, the actuating means 30, if power actuated, are interconnected for synchronous operation and are mounted on a plate member 31 which in turn is secured to the side panel of the vehicle.

The front side rail sections 20 have a top header 32 provided across their forward ends and formed for engagement with the windshield header bar of the vehicle. Since the members comprising each side of the top frame are the same except being symmetrical opposites, in general, hereinafter only one side will be discussed in detail. A pivot plate member 34 is connected to the rear end of the front side rail section 20 and to the forward end of the center rail section 26. The pivot plate is generally triangular in shape with spaced pivot connections 36 and 38 for engagement with the front and center side rail sections 20 and 26, respectively, and with a third pivotal connection 40 disposed apart therefrom for connection to an operating link in a manner described in my Patent 3,180,675, dated Apr. 27, 1965.

The center side rail section 26 is connected to the pivot plate 34, as mentioned, and includes a pivotal connection 42 near its rear end providing engagement with the rear side rail section 28.

The rear side rail section 28 is pivotally connected to the center rail section 26 at 42, as mentioned, and is formed to provide a generally downwardly disposed end 48 which is pivotally connected at 50 to support bracket 31.

Fasteners 54 attach the support structure 31 to the inner surface of a weldment of the vehicle body structure and the bracket 31 includes plate 58 which is attached to the bracket 31 by fasteners and this extension forms a yoke and trunnion pivot support 60 for the hydraulic cylinder 62 which serves as the linear power actuator for the top.

The cylinder 62 is provided with a piston not shown and a piston rod 64. The extended end of the piston rod

4

64 is pivotally mounted to a link 98 by a pivot pin 68. The link 98 has one end pivotally connected to the rear rail pivot pin 70. The pin 70 is spaced from the pivotal connection 50 between the rear rail and the bracket 31. The other end of the link 98 is pivotally connected to the control link 88, via pivot pin 72.

The convertible top mechanism also includes a front bow 71, an intermediate bow 74 and a rear bow 76. The lower end of the rear bow is pivotally connected by a pivot pin 77 to the rear rail 28 as more clearly shown in FIG. 3 of the drawings.

Power for the hydraulic cylinder 62 is provided by a motor and pump assembly 63 connected to the upper and lower ends of the cylinder 62 by hydraulic lines 82 and 84. The motor and pump assembly are conventionally connected to a suitable source of electrical energy through a conventional switch not shown in the drawings whereby when the motor is actuated in one direction the piston rod 64 is extended and when the motor is reversed hydraulic fluid enters the upper end of the cylinder retracting the piston rod.

The upper end of the control link 88 is connected to the extended end of the center rail 26 at pivotal connection 90. As set forth above, the lower end of the control link 88 is pivotally connected at pivot pin 72 to the link 98 and the control link is pivotally connected at 96 to the bracket 31 which also has pivotally connected thereto the rear rail 28 and the hydraulic cylinder 62.

Each of the above-described structures, in the preferred embodiment of the present invention, is constructed of aluminum. As will be more fully described hereinafter, the aluminum members are either extruded or die cast and have novel shapes and configurations to provide the necessary strength along with weld free and generally rivet free assembly and other novel features which will be more particularly pointed hereinbelow.

Referring particularly to FIGS. 1, 1a, 2a and 4a, the vehicle 11 includes, for each side, a door 13 with a roll-up type window 15, a rear quarter section 17 with a downwardly swinging window 176, a rear seat 19, and a rear deck panel 21.

The rear portion of the top fabric 134 supports a hard glass window 23 and the rear end portions of the fabric are fastened to the sheet metal of the body side and rear panels by staples 25 as more clearly shown in FIG. 2a. Sheet metal screws could, of course, be used and the staples or screws eliminate the use of conventional tacking strip requirements. This type of assembly also eliminates the requirements for drain trough provisions commonly used inside of the vehicle body.

At the most rearward portion of the body is installed the rear cover panel 21. The panel, as more clearly shown in FIGS. 1a and 2a, covers the zone of attachment between the fabric and the sheet metal panels to thereby improve the esthetics of the assembly and at the same time the panel 21 facilitates the installation and operational stowing of the large hard glass window 23.

Referring particularly to FIGS. 6, 7, 10, 11, 12, 13, 20 and 21, it will be seen that the front rail 20 and the center rail 26 are formed of extruded aluminum and are generally of U-shaped configuration. Front rail 20 includes a bottom portion 100, an inner leg 102 and an outer leg 104. The outer leg 104 is shaped to provide a channel generally designated 106. The channel 106 has a lower inset groove 108 formed therein and an upper lip 110 which is opened to receive a trim receiving member generally designated 112. The trim receiving member 112, like front rail 20, is preferably made of extruded aluminum and includes a base portion 114, an outer trim edge 116, and an inner plate portion 118 which is shaped to be received in the channel 106. When the plate portion 118 is received in channel 106, by first inserting edge 120 into the groove 108 and snapping the upper end under the lip 110, the trim carrying member 112 may then be immobilized and secured to its rail by a simple staking operation which turns the lip 110 over the inserted member. Staking the lip 110 every 3 or 4 inches has been found to very rigidly secure the trim strip to its rail member. Referring particularly to FIGS. 22 and 23, there is illustrated suitable staking procedures. In these drawings it will be noted that the parts 100 and 112 are inverted and the edge 110 to be staked is placed in a staking die 53 having a generally V-shaped forming opening 55.

The lower surface of the base or cross portion 114 of the trim receiving member 112 has a pair of downwardly and inwardly directed bosses 122 and 124. Between these members is secured a resilient web 126 having a pair of major lobes 128 and 130 between which the upper portion of the vehicle window is received. The resilient web 126 is preferably maintained in its illustrated position by the wedging action of the downwardly and inwardly projecting bosses 122 and 124 and by a suitable adhesive. The outer surface of element 116 of the trim receiving member 112 has secured thereto the padding or webbing 132 and the outer roof fabric 134. The fabrics are preferably secured to said outer surface by suitable adhesives.

Adhesively securing the edges of the fabric 134 to the trim receiving member 112 has proved to be very satisfactory as the primary tension and support for the fabric 134 and its liner 132 is provided by nailing or tacking strips generally designated 136. The nailing or tacking strips 136 comprise metal U-shaped channels 138 which are filled with wood or compressed pulp 140. The tacking strips 136 are secured, such as by bolts 142, to each of the bows 71, 74 and 76.

The trim receiving member 112, in addition to its primary function, has an additional important function as this member in conjunction with pins such as pin 144, having square headed portion 146, provide the means for pivotally interconnecting the various elements of the articulated roof structure. Through the use of the square headed pins, which are locked into position by the trim strip member 112, the major portion of the top structure is assembled without the use of rivets. Reducing number of rivets substantially reduces the manufacturing cost of convertible tops and eliminates damaged or too tight connections which often occur when articulating joint assemblies must be riveted.

The center rail 26 is also of generally U-form in transverse section and includes a base portion 100', inner leg 102' and outer or trim strip receiving leg portion 104'. The outer or trim strip receiving leg portion 104' of the center rail 26 is also channelled as at 106' to receive its trim strip element 112'. The trim strip receiving element 112' has secured thereto, in the manner described with reference to the front rail member 20, resilient sealing strip or web 126', as more clearly shown in FIGS. 6 and 7. The trim strip receiving member 112', like trim strip receiving member 112, retains single headed pivot pins within appropriate bores in channels formed in the U-shaped extruded center rail 26.

Figure 8:
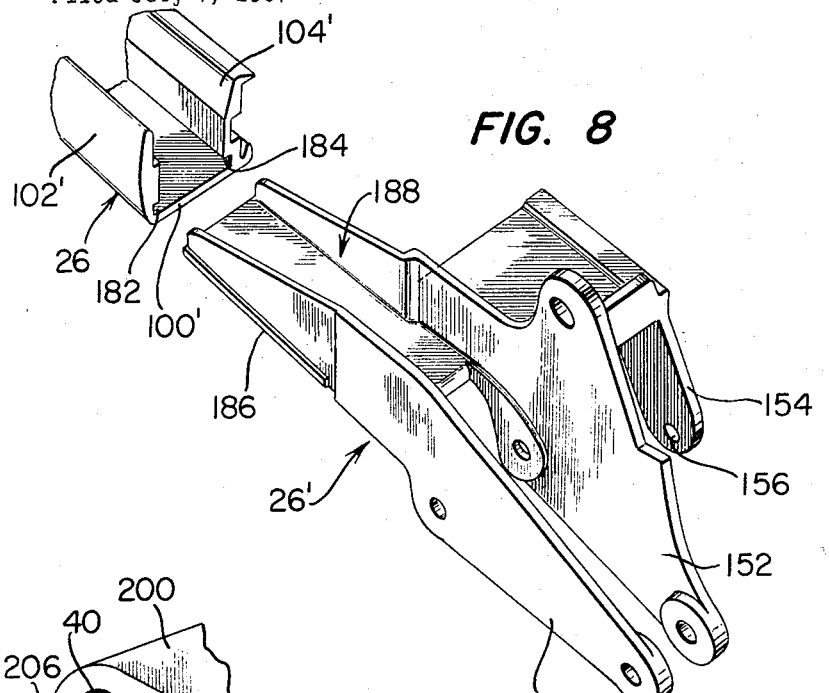
FIG. 8 is a perspective view of the rearward portion, the center rail of the convertible top, and a portion of the forward part of the center rail.

Referring more particularly to FIGS. 5 and 8, the center rail 26 is formed of two elements, the extruded portion discussed in reference to FIGS. 6 and 7 and a die cast rearward portion 26'. The die cast rearward portion 26' is furcated as at 150, 152 and 154.

The furcations 150 and 152 are bored to receive pivot pins 42 and 90 which connect the center rail with the control link 88 and the center rail with the rear rail 28. Furcation 154 is bored as at 156 and pivotally mounts, on pin 156', the upper end of a novel sealing member 158, as more clearly shown in FIGS. 1, 2 and 9. The sealing member 158 has its lower end secured to weldment 160 forming a portion of the interior of the vehicle to which the folding top is to be attached. The attachment between the lower end of the trim member or sealing strip 158 and the weldment 160 is via a slotted opening 162, whereby the connection between the sealing member and the weldment permits adjustment of the folding top to accommodate variations in the size of the vehicle body and the size of the folding top mechanism.

Referring more particularly to FIGS. 1, 4a and 9, the rear quarter window sealing member 158 is illustrated together with the resilient window sealing strip 170 which is secured to the base element by a plurality of studs 172. In FIG. 9 a portion of the body panel designated 160 is illustrated. It is to this panel 160 that the lower end of the window seal strip carrying member 158 is attached via the elongated slot-like opening 162 illustrated in FIG. 2 of the drawings. Also in FIG. 9 there is shown in broken lines a portion of the rear quarter window 176. The outer surface 178 of the rear quarter window bears against the resilient sealing strip 170 when the window is in the closed position. Opening of upwardly swing of the window urges the window in the direction of the directional arrow 180 and since the resilient sealing strip 170 bears against an outer face of the window 176 movement of the window sealing member 158 to the left or to the right as shown in FIGS. 1, 4a, and 9, that is, to the front or to the rear about its pivotal connection 156', as shown in FIG. 2, does not affect the seal provided between the member and the rear quarter window.

Referring again to FIG. 8 of the drawings, it will be seen that the most rearward end of the extruded center rail 26 has machined slots or channels 182 and 184 in the inner faces of the legs 102' and 104'. These machined slots cooperate with corresponding rails or tracks 186 die cast in member 26'. The depth of the slots 182 and 184 with respect to the cooperating rails 186 on the die cast element 26' is such that a force fit between the elements is obtained. By forcing the forward end 188 of member 26' into the rearward end portion of the rear rail 26 substantially permanently joins the two sections. Where desired, however, a pin may be inserted through members 26 and 26' as illustrated at 190, in FIG. 5 of the drawings. However, it has been found that proper control of the machined slots and the die cast cooperating rails 186 generally eliminates necessity for the use of such retaining pin.

Referring now to FIGS. 5, 18 and 19, there is shown means for adjusting the articulate members to accommodate variations in vehicle body sizes and tolerances in the manufacture of the top structures per se and for insuring that when the top is in the extended position the members are taught and rattle-free. As hereinbefore described, the pivot plate 34 generally triangular in shape and is provided with a bearing surface 202 carrying pivot pin 36 for pivotal connection between the pivot plate 34 and the front rail section 20, a bearing member 204 which receives pivot pin 38 to pivotally connect the pivot plate to the center rail section 26 and a third bearing surface 206 which receives pivot pin 40 for connection of the pivot plate 34 to link 200. The most rearward portion of the front rail section 20 has secured to the base portion 100 a bearing plate member 210. The bearing plate member 210 is secured to the inner surface of the base 100 by, for example, screw or rivet means 212. The bearing plate 210 projects rearwardly to provide a lip having a rounded rearward surface 214. When the articulate members forming the top are in the fully extended position as illustrated in, for example, FIGS. 5 and 19, the undersurface of the lip 210 is in bearing contact with the inner surface of the base portion 100' of the center rail section 26. Also associated with the pivot plate 34 is a socket 216'. The socket is bored as at 218 and provided with internal threads 220 at the upper end thereof. The socket 216 receives a stud 222, which stud has an enlarged conical head portion and threads which mate with the internal threads 220. The stud 222 is, for example, slotted as at 224 to receive a screw driver blade whereby the stud may be adjusted inwardly or outwardly relative to the socket 216. The flat head of the stud 222 is adapted to engage and bear against the upper surface of the bearing plate 210 when the top structure is fully extended as illustrated in FIGS. 5 and 19. It will be appreciated that the bearing relationship between the surface 226 of the stud 222 and the plate 210 is increased by screwing the stud downwardly and as this bearing contact is increased greater rigidity is imparted to the members connected by pivot pins 36, 38 and 40 and the frictional engagement between the extended end of the bearing plate 210 and the inner surface of the base 100′ of the center rail 26 is increased. By tensioning the pivotal connections between the pivot plate 34 and the front and center rail sections and the lever arm 200 the entire top structure is maintained in a taught rattle-free condition. It will be further appreciated that any wear occurring in said pivotal connections may be readily compensated for by merely urging the stud 222 downwardly relative to its socket 216.

*Top header*

The top header 32 performs several primary functions. It provides a means for securing the most forward or extended ends of the pair of front rail sections 20 in fixed relationship; it carries the sealing means between the windshield header and the top; it carries latch means for anchoring the top to the windshield header; and it provides the means for attaching the forward end of the top fabric.

The aforementioned functional features of the top header 32 will become apparent from the following detailed description thereof with particular reference to FIGS. 3, 4 and 12 through 16, 18 and 19. In general the top header 32 consists of a center section 250 and a pair of end sections 252 and 252′. The center section 250 is assembled from a pair of extruded aluminum rails or members generally designated 254 and 256. Structural member 254 comprises the primary load bearing element of the top header 32. The structural member 254 includes a generally vertically extending member 260 and a cross web 262. The upper end of the generally vertical member 260 terminates in a bulbous portion 264, while a bead or lip 266 is provided at the most rearward end of the cross web 262. The bulbous portion 264 and the bead 266 cooperate to provide the retaining means for the top forming structural member 256 as to be more fully described hereinafter. The top forming structural member 256 includes a recess 268 which receives the bulbous terminal end 264 of rail 254 as more clearly shown in FIGS. 15, 16 and 17. The trailing edge 270 of member 256 is beveled to provide an edge which will be received adjacent the inner surface of rib or bead 266 and be snuggly engaged by said bead as shown in FIGS. 15, 17, 18 and 19 when the head is staked as shown at 272. This form of assembly is employed as the structural web 260 is bowed rearwardly by stretch-forming and therefore in order to make the above-described connection between the top element 256 and said structural member 254 it is necessary to roll the bulbous terminal end 254 within its receiving slot 268 beginning with the elements positioned as illustrated in broken lines in FIG. 16 to the downwardly full line position prior to spiking the rib bead 266 to maintain the elements in their assembled position.

The most forward portion 274 of the top forming element 256 is provided with a bottom opening slot 276 which slot receives a tacking strip 278. The tacking strip anchors the top fabric 134 and secures, to the member 256, a resilient sealing strip 280. The resilient sealing strip is received on the upper surface of the windshield header as shown in broken lines at 282 in FIG. 15.

The strip 278 is slipped into its groove or slot 276 and side element 277 is folded inwardly as shown in FIGS. 18 and 19 by means of staking tool 279.

The end elements or caps 252 and 252′ are symmetrical left and right hand images and in the preferred form of the invention said elements are formed of die cast aluminum. Each end element is longitudinally recessed as at 284, in FIG. 14 of the drawings, to receive the U-shaped channel members 20 comprising the forward rail sections of the convertible top. As more clearly shown in FIGS. 12 and 13 in conjunction with FIG. 4, the U-shaped channel members 20 slide into the recesses 284 and are secured thereto by studs 286 and 288. Each recess 284 also has provision for slidably receiving its trim carrying rail 114 and a stud 290 maintains the trim carrying rail 114 within the recess.

The die cast end elements 252 and 252′ each includes a lateral extension 298 which lateral extensions receive the locking mechanism 300 which retain the top header 32, on the windshield header as shown in broken lines at 282 in FIG. 15 of the drawings. Each latching mechanism 300 includes a rotatable handle 302 which is secured to a boss 304 by bolt means 308. The boss 304 is journaled for rotation in web 306 of said lateral extension 298. The boss 304 rotatably mounts locking eccentric 310 on off-center bearing element 312. The lower end of the locking eccentric pivotally mounts, on pivot 316, a locking dog 314 which locking dog threadally receives a bolt 320 having a head portion 322. The head portion 322 is received in a bifurcated keeper not shown in the drawings and carried by the windshield header 282. The threads on the shaft of the locking bolt 320 permit adjustment of the tension applied by the latch on rotation of the handle 302 to regulate the force exerted between the windshield header and the top header 32.

As hereinbefore discussed, the folding top may be manually operated and in FIG. 24 a manual form of the device is illustrated and includes spring means 300 which assists in the manual actuation of the folding top.

The spring 300 has one end 302 connected to pin 304 while the other end 306 of the spring 300 is connected to pin 60′. Pin 60′ corresponds to pin 60 which pivotally connects the extended end of the piston rod to link 98. The other elements of the assembly are the same as those described in reference to, for example, FIG. 3 of the drawings and have been provided with primed reference characters.

From the foregoing description of a preferred embodiment of the improved convertible top, it will be seen that the aims and objects hereinbefore set forth are fully accomplished. While a preferred form of the present invention has been specifically illustrated and described, it will be recognized by those skilled in the art that various modifications may be made in the form of various structures without departing from the scope of the present invention as defined in the appended claims.

I claim:

1. In a convertible top mechanism including a plurality of articulately interconnected members including for each side thereof a front rail, a center rail and a rear rail, means pivotally mounting the lower end of the rear rail to the vehicle body, an actuator for the articulately interconnected members, means connecting an element of the actuator to the rear rail, means connecting the rear rail and the center rail for controlled pivotal movement, a plate member, first means pivotally mounting the forward end of the plate member to the rearward end of the front rail, second means pivotally mounting the forward end of the center rail to the rearward end of the plate member, the first and second means pivotally mounting the front and center rails to the plate member being so positioned that when the top mechanism is extended the front and center rails are in generally rectilinear substantially abutting alignment, and adjustable means between the plate member and the front and center rails adjacent the zone of abutment of said rails limiting the pivotal movement of the front and center rails about said first and second pivotal mounting means thereby tensing said front and center rails when the convertible top is fully extended.

2. The invention defined in claim 1 wherein said adjustable biasing means is carried by the plate member between the pivotal mounting means for the front and center rails.

3. The invention defined in claim 1 wherein said biasing means comprises a tongue element carried by the front or center rail and overlapping the other rail and a stud mounted in said plate means and contacting the tongue element when the top mechanism is fully extended.

4. The invention defined in claim 3 wherein the tongue element is secured to the rear end of the front rail and overlaps the center rail.

References Cited

UNITED STATES PATENTS 2,897,003  7/1959  Lelli _____ 296—117

BENJAMIN HERSH, *Primary Examiner.*

R. SONG, *Assistant Examiner.*